United States Patent Office 3,317,597
Patented May 2, 1967

3,317,597
THIOSEMICARBAZONES OF 2-LOWERALKYL-CYCLOPENTANE-1,3-DIONES
Gerhard R. Wendt, Havertown, and Kurt W. Ledig, Philadelphia, Pa., assignors to American Home Products Corporation, New York, N.Y., a corporation of Delaware
No Drawing. Filed Mar. 25, 1966, Ser. No. 537,317
2 Claims. (Cl. 260—552)

This invention relates to thiosemicarbazones and more particularly to specific lower alkyl cyclopentanedione thiosemicarbazones having useful pharmacological properties.

The compounds of the invention may be illustrated by the formula:

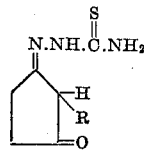

in which R is intended to represent methyl or ethyl.

The compounds may be prepared by reacting a 2-methyl or 2-ethyl cyclopentanedione with thiosemicarbazide in a suitable acidic solvent medium at refluxing temperature. The desired product may be precipitated out of the reaction medium by the addition of water. Surprisingly, while this reaction goes with comparative ease when reacting a cyclopentanedione having up to 2 carbon atoms in the 2-position, it will not go under similar conditions when higher alkyl radicals are in this position.

The best mode for preparing the compounds of the invention is given in the following example:

*Preparation of 2-ethyl-1,3-cyclopentanedione, 1-thiosemicarbazone*

A suspension of 2.5 g. of 2-ethyl-1,3-cyclopentanedione, 1.8 g. of thiosemicarbazide, and 30 ml. of acetic acid was refluxed for 10 minutes. The clear solution was diluted with water 1:1 and the resulting crystalline material filtered to yield 1.2 g. of the title compound: M.P. 242° dec.

*Analysis.*—Calc'd for $C_8H_{13}N_3OS$: C, 48.21; H, 6.58; N, 21.08; S, 16.1%. Found: C, 47.93; H, 6.78; N, 21.39; S, 15.9%.

The corresponding 2-methyl compound may be prepared in the same way, starting with 2-methyl-1,3-cyclopentanedione.

The compounds of the invention have been found useful in experimental pharmacology under standard testing procedures, showing mild antiviral action, but more importantly anti-inflammatory activity. They may be employed by known procedures for reducing inflammation in the animal body at a daily dosage range of 20 to 100 mg. per kilogram.

We claim:
1. A compound having the formula:

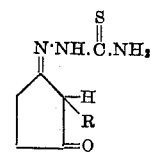

wherein R represents an alkyl of the group consisting of methyl and ethyl.

2. A compound of claim 1 wherein R is ethyl.

References Cited by the Examiner
FOREIGN PATENTS
966,849    8/1964    Great Britain.

ALEX MAZEL, *Primary Examiner.*
HENRY R. JILES, *Examiner.*